(12) United States Patent
Pierce et al.

(10) Patent No.: US 8,954,456 B1
(45) Date of Patent: Feb. 10, 2015

(54) TRANSLATION AND TRANSCRIPTION CONTENT CONVERSION

(71) Applicant: Measured Progress, Inc., Dover, NH (US)

(72) Inventors: Zachary Pierce, Portland, OR (US); Thomas Hoffmann, Newton, MA (US); Michael K. Russell, Wellesley, MA (US)

(73) Assignee: Measured Progress, Inc., Dover, NH (US)

( * ) Notice: Subject to any disclaimer, the term of this patent is extended or adjusted under 35 U.S.C. 154(b) by 0 days.

(21) Appl. No.: 14/225,858

(22) Filed: Mar. 26, 2014

Related U.S. Application Data

(60) Provisional application No. 61/806,576, filed on Mar. 29, 2013, provisional application No. 61/806,617, filed on Mar. 29, 2013.

(51) Int. Cl.
*G06F 17/30* (2006.01)
(52) U.S. Cl.
CPC .................. *G06F 17/30943* (2013.01)
USPC ............................. 707/756; 707/694; 707/803
(58) Field of Classification Search
CPC .......... G06F 17/2264; G06F 17/30569; G06F 17/272; G06F 17/289
USPC .......................................... 707/694, 756, 803
See application file for complete search history.

(56) References Cited

U.S. PATENT DOCUMENTS

| | | | |
|---|---|---|---|
| 6,000,945 A | 12/1999 | Sanchez-Lazer et al. | |
| 6,467,079 B1 * | 10/2002 | Ettritch et al. | 717/108 |
| 6,980,953 B1 | 12/2005 | Kanevsky et al. | |
| 7,047,259 B1 * | 5/2006 | Chasman et al. | 707/999.102 |
| 8,229,343 B2 | 7/2012 | Driscoll et al. | |
| 8,303,309 B2 | 11/2012 | Hoffmann et al. | |
| 8,695,015 B2 * | 4/2014 | Borgendale et al. | 719/313 |
| 2003/0129573 A1 | 7/2003 | Bowers et al. | |
| 2003/0233365 A1 | 12/2003 | Schmit et al. | |
| 2004/0153509 A1 | 8/2004 | Alcorn et al. | |
| 2005/0175974 A1 | 8/2005 | Hansen et al. | |
| 2007/0094595 A1 * | 4/2007 | Heck et al. | 715/700 |
| 2007/0106778 A1 * | 5/2007 | Zeldin et al. | 709/223 |

(Continued)

OTHER PUBLICATIONS

U.S. Department of Education, "Grants for Enhanced Assessment Instruments", Nov. 21, 2009, Internet Archive WaybackMachine, 4 pages.*

(Continued)

*Primary Examiner* — Phong Nguyen
(74) *Attorney, Agent, or Firm* — Maine Cernota & Rardin

(57) ABSTRACT

A system and method for accepting content in a first form, identifying the type of the content, specifying at least a second form, converting the content form from the first to the second form, and continuing conversion for any forms subsequent to the second form. Variant Production Functions create specification-based variant files and supplemental metadata using data from existing resources. A Variant Production Function provides functionality for parsing an existing resource's data, and generating a complete or partial alternate translated form of that resource. The Variant Production Function includes at least the input of the content of the primary target resource file used as the basis for the new variant. Variant Production Functions may be in Auto Generation Configuration Objects, or used as components within a Translation and Transcription Service.

19 Claims, 8 Drawing Sheets

TRANSLATION-TRANSCRIPTION STEPS

(56) References Cited

U.S. PATENT DOCUMENTS

2007/0106998 A1* 5/2007 Zeldin et al. .............. 719/313
2008/0294225 A1 11/2008 Roy et al.
2010/0178645 A1 7/2010 Ieperen et al.
2012/0143777 A1 6/2012 Jensen et al.
2012/0158701 A1* 6/2012 Otsuka et al. .............. 707/722

2012/0331411 A1 12/2012 Dempsey

OTHER PUBLICATIONS

QTI2/APIP Alliance, Apr. 8, 2011. Retrieved Aug. 15, 2014 from <https://web.archive.org/web/20110408201839/http://www.imsglobal.org/apip/alliance.html.

* cited by examiner

CONTENT CONVERSION ENVIRONMENT

TRANSLATION-TRANSCRIPTION ENVIRONMENT

TRANSLATION-TRANSCRIPTION AMONG SPOKEN LANGUAGES

TRANSLATION-TRANSCRIPTION AMONG CODES

ATTRIBUTES DEFINING TRANSLATION-TRANSCRIPTION

600

```
┌─────────────────────────────────────────────────────────────────┐
│              605 PARAMETER SPECIFICATION INPUT                  │
│                                                                 │
│   - 610 NUMBER OF CONTENT TYPES                                 │
│                                                                 │
│   - 615 CONTENT TYPE RELATIONSHIPS                              │
│                                                                 │
│   - 620 FIRST CONTENT TYPE                                      │
│                                                                 │
│   - 625 SUBSEQUENT CONTENT TYPE(S)                              │
│                                                                 │
│   - 630 INITIAL CONTENT FORM(S)                                 │
│                                                                 │
│   - 635 CONTENT OUTPUT FORM                                     │
│                                                                 │
│   - 640 SUBSEQUENT CONTENT OUTPUT FORM(S)                       │
│                                                                 │
│   - 645 ENVIRONMENT-RELEVANT PROGRAMMING CONSTRUCTS             │
│         650 PRE-PREPARED VARIANT PRODUCTION FUNCTIONS           │
│         655 AUTO GENERATION CONFIGURATION OBJECTS               │
│                                                                 │
│   - 660 OTHER CONTENT-TRANSFORMATION SPECIFICATION MODES        │
│         665 PARSING                                             │
│         670 DATA-TRANSFORMATION                                 │
│         675 REPRESENTATION ASSISTING DOCUMENTS/ARTIFACTS        │
│                                                                 │
└─────────────────────────────────────────────────────────────────┘
```

TRANSLATION-TRANSCRIPTION PARAMETER ELEMENTS
FIG. 6

TRANSLATION-TRANSCRIPTION STEPS

CONTENT CONVERSION AUTO-GENERATION STEPS

TRANSLATION AND TRANSCRIPTION CONTENT CONVERSION

RELATED APPLICATIONS

This application claims the benefit of U.S. Provisional Application No. 61/806,617, filed Mar. 29, 2013 and No. 61/806,576, filed Mar. 29, 2013. These applications are herein incorporated in their entireties by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to a system and method for accepting content in a first form, identifying its type, specifying a second form, and converting the content form from the first to the second form.

BACKGROUND OF THE INVENTION

Content creation for environments such as testing is commonly a collaboration among varied parties. For example, in today's distributed world, content developers and consumers employ different spoken languages and different encoded data formats. While standards for the organization, transmission, and presentation of content ensure interoperability, there is a need to work within these standards to convert the content between its input form and the output form required by the content consumer. Diverse consumers will require diverse conversion capabilities. An example of a standard for education-related content supporting diverse content users is the Accessible Portable Item Protocol (APIP™) standard.

APIP™ is an XML based open standard that provides a way for computer based assessment content to be transferable and accessible. Transferability means items can be easily moved between assessment administration, authoring, and content storage systems created and managed by potentially different organizations. Accessibility means that by pre-specifying student needs, the test content and testing environment can be tailored to meet each student's individual needs. The APIP™ Standard comprises a series of data models with standardized XML representations centered on a version of the Question and Test item Interoperability (QTI) Standard. APIP™ provides a large number of XML meta-data elements (tags) that can be associated with content elements in a QTI item file and which are designed to provide specific accessibility supports. Test items are created under the APIP™ standard. While this provides a foundation, it does not implement conversions.

What is needed is a system and method to convert content from one form to another within the confines of a standard.

SUMMARY OF THE INVENTION

An embodiment of the invention provides a computer-implemented method for converting input content, the method comprising accepting, at a computing device, content in a first form; identifying, by the computing device, the type of the accepted content in the first form; accepting, at the computing device, parameter specification input; specifying at least a second form for the accepted content in a first form; converting, by the computing device, the accepted content form from the first form to the second form; continuing conversion, by the computing device, for any forms subsequent to the second form; and producing, by the computing device, output content. In ensuing embodiments, the accepted content in a first form is compliant with Accessible Portable Item Protocol (APIP) specification standard. A following embodiment comprises business rules wherein the business rules differ between content regions serving different semantic purposes, and the business rules differ within an assessment. Subsequent embodiments comprise parameter specification input comprising number of content types, content type relationships, first content type, at least one subsequent content type, at least one initial content form, content output form, and at least one subsequent content output form. For additional embodiments additional inputs comprise programming constructs relevant to an environment and other modes of content-transformation specification. In embodiments, other modes of content-transformation specification comprise Variant Production Functions, or Access Element List Generator Functions. Ongoing embodiments comprise different business rules for each of question content, feedback content, rubric content, and instructional content. In some embodiments, each of question content, feedback content, rubric content, and instructional content is within a single content asset. In further embodiments access elements, resource metadata, and inclusion orders are produced. In yet further embodiments a sub-set of accessibility information to produce a sub-set of media elements, and assigning the media elements to accessibility elements. Embodiments further comprise modes of content-transformation specification comprising parsing, data-transformation, and representation assisting documents/artifacts. In embodiments, documents/artifacts comprise XML Schema files, Extensible Stylesheet Language Transformation files, JSON Schema Files, GNU Bison/Yacc Grammar Files, Speech Synthesis Markup Language files, Speech Recognition Grammar Specification files, Pronunciation Lexicon Specification documents, etc.

Included embodiments comprise generating metadata about the input content and the output content forms, the metadata identifying relationships between original input and second and subsequent forms. In related embodiments the metadata is encapsulated in a form of Accessible Portable Item Protocol (APIP) variant entities, whereby which available forms of some content should be used or operated upon in a given circumstance is resolved. In ensuing embodiments, the metadata comprises identification information, the identification information comprising transferred and adopted versions of metadata about original input content, and production lifecycle metadata. For other embodiments, the metadata comprises a time and means of secondary form creation. In embodiments, the metadata included in the output also records when the secondary form was created. The means of secondary form creation are, generally the particular embodiment of the method used along with the specific identifying information about the parameters used. For embodiments, the time/means metadata is recorded in the Package Manifest, within the new variant resource's personal metadata section. In APIP™ embodiments, this would usually be noted within the IEEE LOM's subsection for "lifecycle". manifest/resources/resource/metadata/lom/lifecycle/contribute is the exact element, which in turn allows for a description of the date and the description of the creator/creating-process.

An additional embodiment provides one or more non-transitory computer-readable media storing one or more computer-executable programming instructions that when executed cause a computer processor to carry out steps comprising one or more instructions for accepting content in a first form; one or more instructions for identifying a type of the content; one or more instructions for accepting parameter specification input; one or more instructions for specifying at least a second form; one or more instructions for converting the content form from the first form to the second form; and one or more instructions for continuing conversion for any forms subsequent to the second form. For continuing embodiments, the accepted content is compliant with Accessible Portable Item Protocol (APIP) specification standard. Ongoing embodiments comprise one or more instructions for producing file names and associating the file names and the metadata with accessibility elements defined within XML code. For following embodiments input comprises one or more instructions for parameters that supply at least a subset of a capability to translate/transcribe/transform content themselves. A nonlimiting example would be a parameterization of translation and transcription services that accepts a concrete function implementation responsible for identifying a particular type of content by use of natural language processing. A further example comprises an alternate parameterization where the translation and transcription services accepts a list of key metadata fields and values to compare against in order to determine whether to accept content from a resource in a first form. In yet other embodiments there are one or more instructions for converting between at least two of text, Nemeth code, Mathml, ASCII, Braille, JavaScript Object Notation (JSON), and HTML.

A yet further embodiment provides a computer system comprising one or more processors and computer-readable memory comprising computer executable instructions stored therein that, responsive to execution by the one or more processors, cause the one or more processors to import a test item; access business rules residing in a rule library, wherein the business rules are different for question content versus feedback content versus rubric content versus instructional content, all of which may be within a single content asset; apply translation and transcription algorithms to convert content from one form to another; apply the business rules and the translation/transcription algorithms to produce access elements, resource metadata, and inclusion orders; use a sub-set of accessibility information to produce a sub-set of media elements in an automated manner; assign the media elements to accessibility elements; record results as XML that complies with an Accessible Portable Item Protocol (APIP) standard to produce an APIP compliant item file; and verify the file as being APIP compliant.

BRIEF DESCRIPTION OF THE DRAWINGS

FIG. 6 depicts translation-transcription parameter elements configured in accordance with an embodiment of the invention.

DETAILED DESCRIPTION

Figure 1:
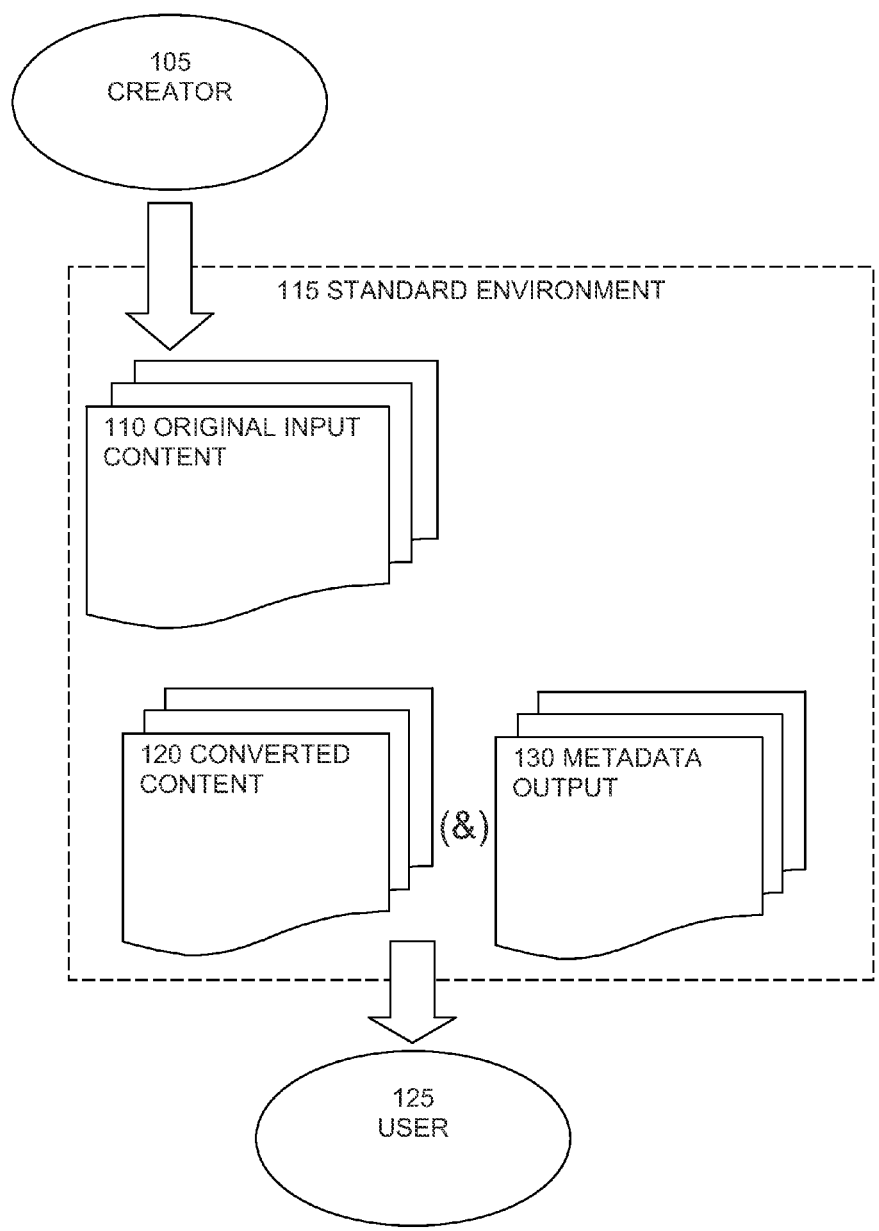
FIG. 1 is a depiction of the content conversion environment configured in accordance with an embodiment of the invention.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

GLOSSARY

To assist in understanding, terminology is initially defined.

Accessibility refers to tailoring the content and the delivery environment to meet each student's individual needs. Here, through pre-specifying student needs. Accessibility to digital content is provided when the content and delivery environment can be accessed by people with a range of differing cognitive, sensory, and interaction capabilities. Examples of the delivery environment can include user interface and any ancillary devices such as a tactile pad.

Accessibility Data is data used to provide varied representations of subject matter based on accessibility needs.

Accessibility Elements are a collection of accessibility data and metacontent connected to some portion of one or more content elements. Accessibility Elements refer to Content Elements. "Access Element" may also be used as a synonym for "Accessibility Element".

Access Element List Generator, also known as Access Element List Generator Function, is a function conforming to a specification (input: ids+content, output: Ordered Access Elements) targeted to make zero or more Access Elements for a specific Audience and Usage Type.

Access Element List Generator Functions (basically plural of Access Element List Generator, also known as Access Element List Generator Function) are collections of functions conforming to a specification (input: ids+content, output: Ordered Access Elements) where each function is targeted to make zero or more Access Elements for a specific Audience (such as "nonVisual") and Usage Type (such as "default" or "on demand").

Accessibility Data are metacontent or references to alternate content to support accessibility-related capabilities. Examples include Braille text, references to sound files, clarified text-to-speech pronunciations, references to sign language videos, translations of targeted content, and textual guidance about content intended to assist those with linguistic or cognitive barriers to comprehension.

Accessibility Extensions are specialized methods for presenting and/or interacting with content that (1) are designed to meet very specific needs for a subset of users, and (2) generally interfere with the content's use by users outside of the subset. Accessibility in the context of learning (accessing information) involves one-way communication in which a user receives and processes information.

"accessibilityInfo" is the name of a particular element within APIP™ for the collection of all Access Elements related to a given Content Region.

Accessibility Generator Sweep processes each Content Region within the content through a series of Generator Functions that create Access Elements and put those Elements in Ordered Lists.

Accessibility Modification Sweep follows the Generator Sweep and modifies existing Access Elements and/or Package Manifests for new media files that would be created or supplemental enhancement of accessibility data.

APIP™ is the acronym for Accessible Portable Item Protocol. APIP™ is an open technical standard for digital interchange of accessible assessment content (items and tests). The standard provides assessment programs and question/item and system developers with a data model for standardizing the interchange file format for digital test items. APIP™ also describes digital delivery options for a range of common accessibility needs. Use of APIP™ enables accessible, digital assessment materials to be exchanged efficiently and accurately among a wide variety of systems. It furthermore specifies means for describing which portions of accessibility needs are relevant to a given assessment session, and guides the usage of this accessible content, in the form of Personal Needs & Preferences (PNP) data models.

APIP™ Compliant, a system with validated support for QTI™, PNP, and APIP™ elements (tags). Alternately, a piece of content may be considered APIP™ Compliant when it conforms to the data document specification of an APIP™ profile, such as Entry or Core. The APIP™ standard applies to both content and systems.

APIP™ variant entity is the existence of more than one variant of an item or other Package Resource in an APIP™ Content package. Some access features might require the delivery system to provide an entirely different representation of the default content in the original item. For example, for an original item presented in English, there is a translated version in Spanish that is available to those students who need the test content delivered in Spanish. Both the English and Spanish versions of the item are known as variants. Each variant of an item has its own accessibility information coded within its item XML file. For example, to support spoken accessibility needs for both the English and Spanish examinees, the original English variant will have spoken access feature information in the apipAccessibilityInfo section of its XML file, and the Spanish variant (in a different XML file) will have its spoken access feature information within the apipAccessibilityInfo section of its XML code. By separating the representations into different variants, there is less confusion about the accessibility information available for the presented representation. In APIP™ v1, if one or more Item Translations or Simplified Language were required, item packages would contain more than a single variant for an item. If these access features are not offered to examinees, an APIP™ item package is expected to contain only a single variant.

Assessment involves two-way communication in which information presented to a user must be carefully constructed to stimulate the knowledge, skills, and/or abilities that are the target of the assessment. The user must be able to interact with that information, and then must be able to communicate back through the assessment vehicle a visible record that is the product of stimulated knowledge, skills, or abilities.

Assets can include assessment tests, sections, and items, traditional questions and instructional content, and QTI™-based rubric blocks and feedback content, and related media. See also Content Assets and Media Assets.

Attribute in an XHTML/HTML context is a modifier of an HTML element. HTML attributes generally appear as name-value pairs, separated by "=". They are written within the start tag of an element, after the element's name: <tag attribute="value"></tag> (content to be modified by the tag). Attributes may be used to store data relevant to their enclosing XML element.

Audience refers to users, typically grouped by similar characteristics such as accessibility needs. Examples within the APIP™ standard include "nonVisual" and "signedEnglish."

Audience and Usage Type Pair refers to a combination of a single Audience and a particular Usage type. An example within the APIP™ standard is "nonVisualDefault", a combination of the "nonVisual" audience and the "default" usage Type. Another example is "signedEnglishOnDemand", a combination of the "signedEnglish" audience and the "on demand" usage type.

Auto-Generation Configuration Object includes Auto-Generation preference settings and compile-or-runtime-editable slots for Generator Functions that produce specification-based Access Elements for a specific audience and usage type pair, (an "Element Order List" or "Inclusion Order"). Another use of auto-generation configuration objects is to store preference settings and/or compile-or-runtime-editable slots for Variant Production functions that produce specification-based variant files and metadata.

Business Rule Library access and applying is in part defined by the fact that the Access Element Generator Functions are, for embodiments, the core mechanism of making rule-based accessibility data. In embodiments, either the business rule operations or the function-specific operations can be collapsed into each other. The Business Rule Library also optionally comprises configuration data and code to enable or execute the translation and transformation of parts or whole Assets, i.e. Variant Production Functions. This may optionally include means for creating or modifying Auto-Generation Configuration Objects. Broadly defined, business rules include both translation/transcription components (that do whole-file transformations) and accessibility-autogeneration rule components that can operate either on pre-existing resource variants (i.e. the ones being used as the source for later alternate versions), or on the output resources made via translation/transcription.

Content Area refers to a topic or subject area within education.

Content Assets comprise assessment tests, sections, and items, including both traditional questions and instructional content and QTI-based rubric blocks and feedback content.

Content Container is the primary or default XML content input to the Access Element List Generator Functions along with the Maintained Id Set.

Content Elements are XML content that comprise the Default Content, and in the case of APIP™/QTI™, are aligned with a modified version of the XHTML definition of content tags. Content Elements may be uniquely identified by use of an Id Attribute. Content elements do not contain Access Elements; rather, Access Elements refer to Content Elements.

Content Identifiers are names given to sub-sets or blocks of Default Content.

Content Package is a data model composed of a Manifest and related resource data. Within the APIP™ context, a Content Package has a formal definition and a standard representation approach.

Content Package Manifest see Package Manifest.

Content Region is a portion of a Content Asset that represents a default Content Container and its associated Accessibility Data Container. A Content Region can contain multiple Content Elements within its Content Container portion and multiple Access Elements within its Accessibility Data portion.

Default Content is the XML content intended for primary rendering and display to assessment users. This Default Content is what is shown to users when the user, content setting, or delivery system characteristics dictate that no modifications are necessary for accessibility reasons.

Element in an XHTML/HTML context, HTML elements represent semantics, or meaning. HTML is written in the form of HTML elements consisting of tags enclosed in angle brackets (<html>). In HTML syntax, most elements are written with a start tag and an end tag, with the content in between. An HTML tag is composed of the name of the element, surrounded by angle brackets. An end tag also has a slash after the opening angle bracket, to distinguish it from the start tag.

Element Order Lists comprise Access Elements or references thereto for a specific Audience and Usage Type Pair; also called an Inclusion Order in colloquial APIP™ terminology.

Final Package is a Content Package with an updated Manifest, updated Content Assets, and updated/additional media resulting from the workflow steps for the Regulating Configurations.

Generator Functions create standards-compliant Access Elements and put those Elements in Ordered Lists to meet the accessibility needs of a specific Audience and Usage Type Pair. In embodiments, the output of a Generator Function should contain the data equivalent of an APIP™ Element Order List and its connected Access Elements. The access and applying of the Business Rule Library is in part covered by the fact that the Access Element Generator Functions are the core mechanism of making rule-based accessibility data within a given pre-existing variant. Thus, either the business rule part or the function-specific part could be collapsed into each other.

Generator Sweeps process each Content Region within the content through a series of Generator Functions that create Access Elements and put those Elements in Ordered Lists; types include accessibility.

Identifier References point to identifiers existing in a target content's assessment resource.

ID Set is a set of unique IDs. They may be generated by inspecting the Input Content Container prior to running the Access Element List Generator Functions, and augmented by external constraints as necessary.

Inclusion Orders (an APIP™ term) comprise Access Elements for a specific Audience and Usage Type Pair, in the order of desired presentation for that specific audience. Also referred to here as Element Order List(s).

Interoperability see Transferability.

Item File can be input as a component of a Starting Package, and output as a component of a Final Package. It includes default content, optionally accessibility metadata, and other data relevant to assessment management.

Library, a stored collection of, for example, rules—selections made from a library are used in processing related to the characteristics of the selected, for example, rules.

Manifest is a synonym for a Package Manifest.

Media Assets comprise images, sound files, video files, data files, style sheet files, code files, etc.

Metadata is, generally, data about data.

Modification Sweeps step through each of the Assets and perform operations to transform Content Assets in manners consistent with the Configured Business Rules for accessibility auto-generation.

Modified Content Assets are starting content that has been processed through Accessibility Generator Sweep and Modification Sweep of Regulating Configurations.

Ordered Access Elements are collections of Access Elements or references thereto with a defined order. Ordered Access Elements may be used during the construction of one or more Element Order Lists, which in turn, provide a mechanism for alternate ways of ordering a non-ordered collection of Access Elements.

Package Manifest uniquely identifies the files within a Content Package and contains additional information about those files. Additional information includes dependent resources for the test, section, or items, the type of the resource files referenced, as well as other assessment metadata.

Package Resources are both the physical file data within a Content Package and the portion of the Package Manifest used to identify and supply metadata about a given file. Resource files are typically Content Assets or Media Assets, though other supplemental types of files may be present.

QTI™ (Question and Test Interoperability™), is a technical standard for digital interchange of assessment content.

QTI™ File is a file containing data, typically in XML, in support of applications adhering to the QTI™ standard.

QTI™ Item is an item whose content provides default content and other assessment management data conforming to the QTI™ standard. Typically manifested as an Item File containing QTI™-compliant XML code of the assessment-Item element type.

(QTI™) Resource Files contain QTI™ or APIP™ XML elements (tags), or other digital file data in support of QTI™ assessment-related documents. Resource Files are typically Content Assets or Media Assets, though other supplemental types of files may be present.

Regulating Configurations comprise Accessibility Generator Sweep and Modification Sweep workflow steps.

Resource File see QTI™ Resource File.

Roster is an assessment system providing the specific needs of individual students; these are documented in a PNP profile, possibly combined with supplemental student information.

Runtime Reflection is a dynamic code inspection and production technique.

Standard Compliant refers to an application that can pass certification to conform to a standard.

Starting Content Assets are inputs to the Accessibility Generator sweep, each containing at least one Content Region.

Starting Package is a Content Package used as an input to the accessibility auto-generation method described.

Tags are XML representation components that are used to delimit and construct data structures such as elements.

Top Level (Content Container) is a Content Container with no Content Elements hierarchically above it in the Content Asset.

Transferability refers to the characteristic of content that enables it to be easily moved between assessment administration, authoring, and content storage systems created and managed by (potentially) different organizations without loss of significant data characteristics. Transferability and 'interoperability' are treated as synonyms within this context.

Usage Type is, in APIP™ terminology, either "default" or "on demand", referring to the expected presentation/interaction contexts through which a piece of metacontent is made available. "Default" metacontent is expected to be made available during the standard presentation of the whole content region and whenever users request metacontent, typically by interacting with the metacontent's connected Content Elements. "On Demand" usage is for metacontent that is only presented to users when they expressly request it, typically by interacting with the metacontent's connected Content Elements.

Variant Production Functions create specification-based variant files and supplemental metadata using data from existing resources. A Variant Production Function comprises the functionality for parsing an existing resource's data, and generating a complete or partial alternate translated form of that resource. Optionally, a Variant Production Function may also produce metadata about the output variant. A Variant Production Function requires at least the input of the content of the primary target resource file used as the basis for the new variant, but may also require access to the Package Manifest, metadata about the package or the resources within it, the content of other files related to the primary source, or use-specific options settings. Variant Production Functions may be materialized within Auto Generation Configuration Objects, or used as components within a Translation and Transcription Service.

XHTML is an acronym for eXtensible HyperText Markup Language, a family of XML markup languages mirroring or extending versions of Hypertext Markup Language (HTML). It is HTML defined as an XML application, with a data model very similar to HTML 4.01.

Embodiments employ abstraction and intermediate representations of content to isolate that content from the way it is depicted. This abstraction instills flexibility of output, enabling changes and upgrades to display technology or content analysis tooling, for example. Even the functionality of the transformation/accessibility-autogeneration system itself can be improved through upgrades to content analysis tooling, thus improving the quality of the output further. The tools support the production of content files that conform to standards or defined XML schema. Embodiments of the invention provide auto-generation for APIP™ as a set of tools designed to support the production of content files that conform to the APIP™ Standard. For embodiments, accessibility auto-generation functionality resides for a large part within a reusable code library. As mentioned, the APIP™ Standard includes a set of XML extensions to the Question and Item Interoperability (QTI™) Standard. APIP™ provides a large number of XML metadata elements that can be associated with content elements in a QTI™ item, section, or test file and which are designed to provide specific accessibility supports.

FIG. 1 depicts the general environment 100 for content conversion. Creator 105 produces original input content 110, conforming to standardized environment 115. Within the constraints of standard environment 115, converted content 120 is produced adapted to the needs of user 125. In embodiments, metadata to help identify and manage the adaptation is provided as a secondary (optional) output 130. For embodiments, there can be multiple standards, self-imposed standards, or no current standard. In other embodiments, content generation can be up-front, ongoing, or iterative. For example, content may be converted from its original form to another form, back to the original form, or to a third form.

Figure 2:
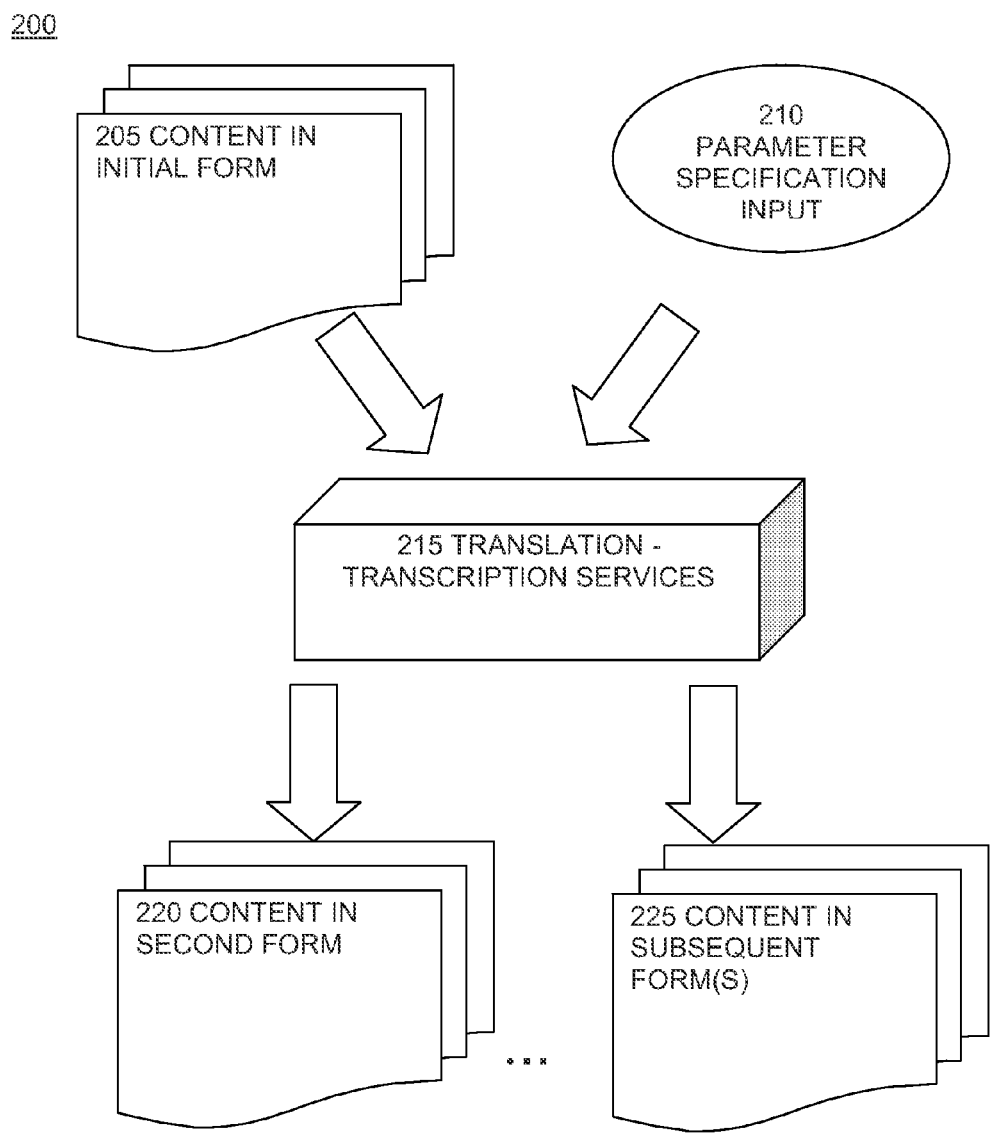
FIG. 2 is a depiction of the general translation-transcription environment configured in accordance with an embodiment of the invention.

FIG. 2 depicts a translation-transcription environment 200. Content in its initial form 205 is combined with input parameter specifications 210. These are combined in translation transcription services 215. Based on the specified parameters, content in a second form 220 is generated from content in original form 205. For embodiments, additional, subsequent, forms of content 225 are created by translation transcription services 215. For embodiments, an additional output comprises accompanying metadata 230 and 235 that serves to identify the relationships between the original input and the second and subsequent forms. This metadata, encapsulated in the form of APIP™ "variant" entities in embodiments, helps systems resolve which available forms of some content should be used or operated upon in a given circumstance. For embodiments, this metadata is required. Embodiment metadata that is additionally produced includes identification information, transferred and adopted versions of metadata about the original input content, and production lifecycle metadata (e.g. the time and means of secondary form creation).

Figure 3:
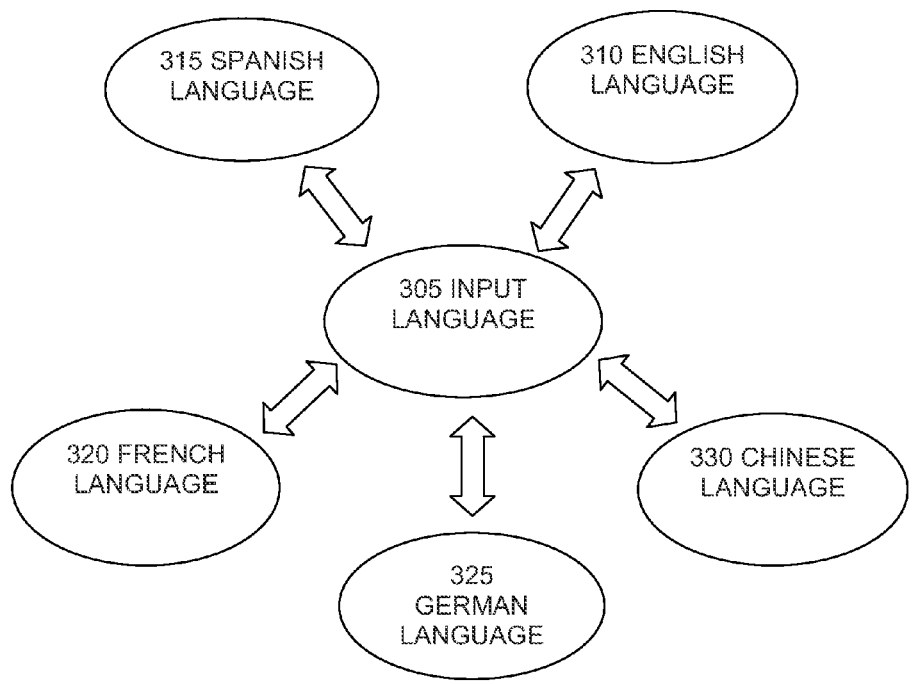
FIG. 3 is a depiction of translation-transcription spoken languages configured in accordance with an embodiment of the invention.

FIG. 3 depicts translation-transcription among spoken languages 300. Embodiments process input language content 305 into and between other spoken languages such as English 310, Spanish 315, French 320, German 325, and Chinese 330.

Figure 4:
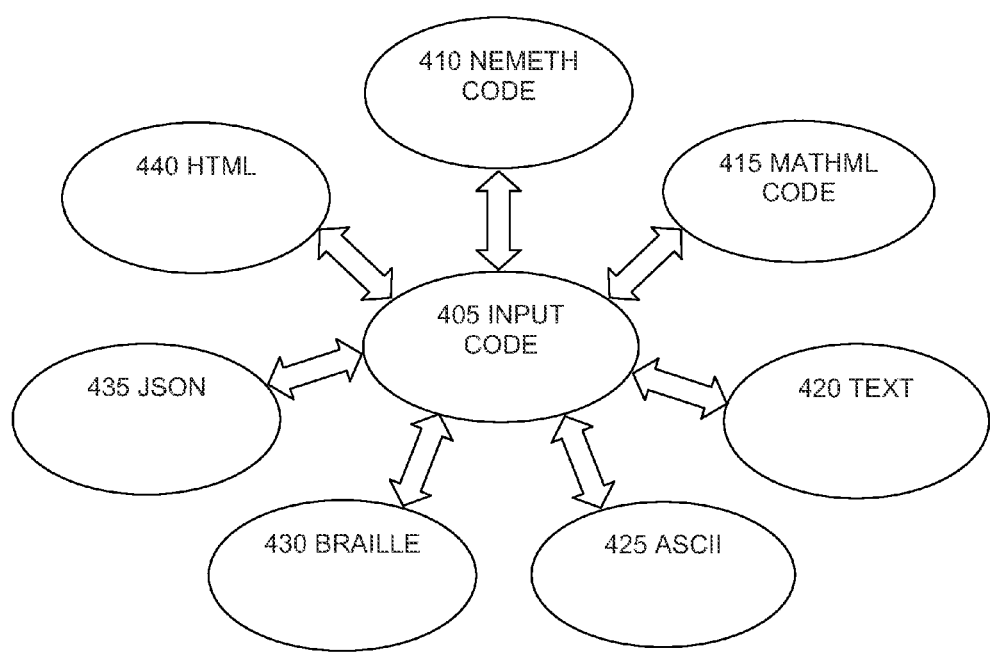
FIG. 4 is a depiction of translation-transcription code configured in accordance with an embodiment of the invention.

FIG. 4 depicts translation-transcription among codes 400. Embodiments process input code content 405 into and between other code content such as, in nonlimiting examples, Nemeth code 410, Mathml 415, text 420, ASCII 425, and Braille 430, JavaScript Object Notation (JSON) 435, and HTML 440. A great many forms of encoded data can be converted. Embodiments comprise both XML and non-XML-based data representations.

Figure 5:
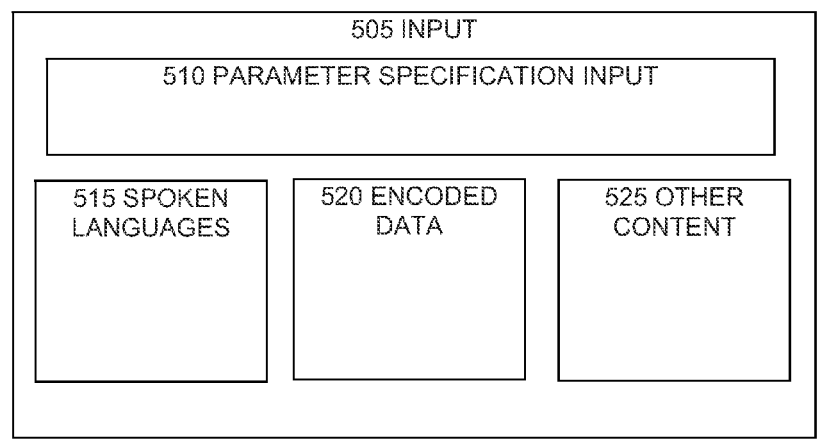
FIG. 5 depicts attributes defining translation-transcription configured in accordance with an embodiment of the invention.

FIG. 5 depicts attributes defining translation-transcription 500. Input 505 comprises at least one of parameter specification input 510, spoken languages 515, encoded data 520, and other content, if any, 525.

FIG. 6 depicts translation-transcription parameter elements 600. Parameter specification input 605 corresponds to the parameter specification input 510 of FIG. 5. Elements used as parameter specification input 605 comprise number of content types 610, content type relationships 615, first content type 620, subsequent content type(s) 625, initial content form(s) 630, content output form 635, and subsequent content output form(s) 640. For embodiments, additional inputs may include any programming constructs relevant to the environment 645 such as pre-prepared Variant Production Functions 645 or Auto Generation Configuration Objects 650, and other modes of content-transformation specification 660, such as parsing 665, data-transformation 670, and or representation assisting documents/artifacts 675. For embodiments, parameters are input that supply at least some portion of the capability to translate/transcribe/transform the content themselves.

Figure 7:
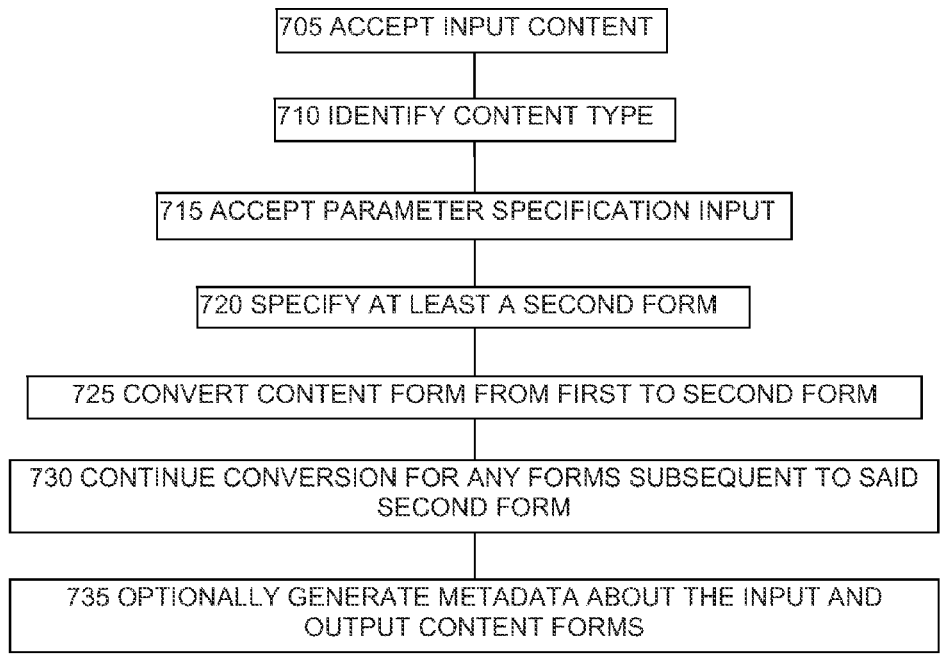
FIG. 7 depicts translation-transcription method steps configured in accordance with an embodiment of the invention.

FIG. 7 depicts translation-transcription steps 700. The steps comprise accepting content in a first form 705; identifying type of content 710; accepting parameter specification input 715; specifying at least a second form 720; converting the content form from the first to the second form 725; continuing conversion for any forms subsequent to the second form 730; optionally generating metadata about the input and output content forms 735.

Figure 8:
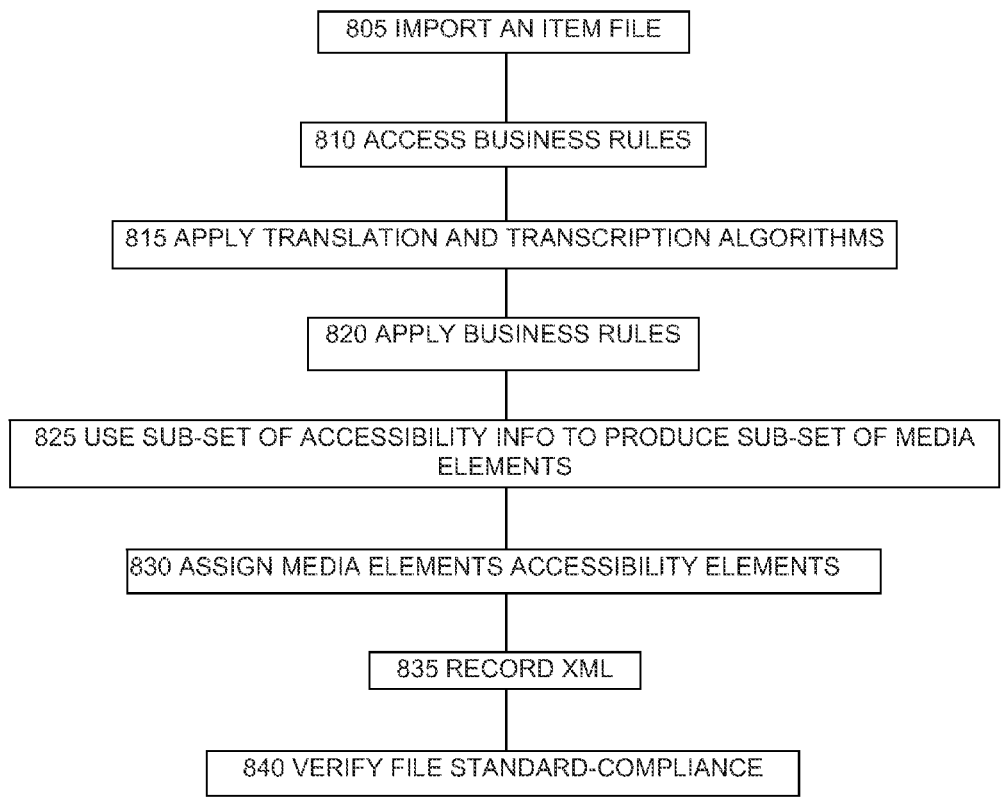
FIG. 8 illustrates auto-generation configuration object preparation configured in accordance with an embodiment of the invention.

FIG. 8 describes steps involved 800 to produce a standard-compliant Final Content Package. Examples of such Final Content Packages are shown as items 120 of FIGS. 1, and 220 and 225 of FIG. 2. In embodiments, the complete package includes a combination of both 120 and optionally some of 130 from FIG. 1, not just 120. Similarly, in embodiments, both 220 and 225 are combined into a single output content package. Steps for embodiments comprise importing a QTI™ or APIP™ content asset file such as a test item 805. Accessing business rules that reside in a rule library 810. For embodiments, business rules specify a variety of decisions that should be made. These can include the preferred size of content elements (e.g., individual word, chunked by whole sentence, chunked by punctuation marks, chunked by paragraph), specific ways in which numerical information is to be presented as text strings (e.g., how to present $x^2$ as a test string, such as "x squared" or "x raised to the power of two"), and preferred inclusion and ordering of access elements in an inclusion order. For embodiments, business rules may differ across assessment programs, content areas, and/or grade levels within an assessment program. Business rules may also differ between content regions serving different semantic purposes within an assessment. For example, in embodiments different business rules are used for question content versus feedback content versus rubric content versus instructional content, all of which may be within a single content asset. Applying translation and transcription algorithms to convert content from one form to another (e.g., translating English text into Spanish, translating mathml to text or mathml to Nemeth code, transcribing mathml and text to Braille Ascii) 815. Applying the business rules and translation/transcription algorithms to produce access elements, resource metadata, and inclusion orders using algorithms that produce this data by embodiment steps 820. As mentioned, in embodiments business rules include both translation/transcription components (that do whole-file transformations) and accessibility-autogeneration rule components that can operate either on pre-existing resource variants (i.e. the ones being used as the source for later alternate versions), or on the output resources made via translation/transcription. Using a sub-set of accessibility information that was produced by embodiment steps to produce a sub-set of media elements (e.g., sound files or video animation files) in an automated manner 825. Assigning the media elements produced by embodiment steps to accessibility elements 830. Recording the above as XML that complies with (in this case) the APIP™ standard to produce an APIP™ compliant item file 835. Verifying a file as being (for embodiments APIP™) compliant 840. In embodiments, this comprises passing it through a third-party item file verification tool. For other embodiments a first or second party content package verification tool is employed, especially if the verification tool complies with the relevant standards.

The above processing steps generate surprising efficiencies and great consistency through the application of business rules. Errors are reduced/eliminated when producing XML code. This includes associating content elements with default content, accessibility elements with content elements, accessibility information with accessibility elements, and accessibility elements with inclusion orders.

Embodiment steps combine several methods and technologies to provide a distinctive approach to APIP™ and other standard-conforming item file production. These methods and technologies comprise: libraries that contain business rules; algorithms to translate or transcribe content from one form to another; parsing and appending content to an XML file using algorithms; interacting with external text-to-speech, animation, and media transformation engines to produce media elements; using algorithms to produce file names and to associate file names and metadata with accessibility elements defined within XML code; using algorithms to produce an XML file that conforms with an open standard; and interacting with an external verification tool.

The foregoing description of the embodiments of the invention has been presented for the purposes of illustration and description. It is not intended to be exhaustive or to limit the invention to the precise form disclosed. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A computer-implemented method for converting computer-based assessment human user interface input content, the method comprising:
   accepting, at a computing device, computer-based assessment human user interface content in a first form;
   identifying, by said computing device, type of said accepted computer-based assessment human user interface content in said first form;
   accepting, at said computing device, parameter specification input;
   specifying at least a second form for said accepted computer-based assessment human user interface content in a first form;
   converting, by said computing device, said accepted computer-based assessment human user interface content form from said first form to said second form;
   continuing conversion, by said computing device, for any forms subsequent to said second form; and
   producing, by said computing device, computer-based assessment human user interface output content, wherein there are different business rules for each of question content, feedback content, rubric content, and instructional content of said computer-based assessment human user interface content.

2. The method of claim 1, wherein said accepted computer-based assessment human user interface content in a first form is compliant with Accessible Portable Item Protocol (APIP) specification standard.

3. The method of claim 1 comprising business rules wherein said business rules differ between content regions serving different semantic purposes, and said business rules differ within an assessment.

4. The method of claim 1, comprising computer-based assessment human user interface parameter specification input comprising number of content types, content type relationships, first content type, at least one subsequent content type, at least one initial content form, content output form, and at least one subsequent computer-based assessment human user interface content output form.

5. The method of claim 1, comprising additional inputs comprising programming constructs relevant to an environment and other modes of computer-based assessment human user interface content-transformation specification.

6. The method of claim 1 wherein each of question content, feedback content, rubric content, and instructional content is within a single content asset of said computer-based assessment human user interface content.

7. The method of claim 1 comprising producing access elements, resource metadata, and inclusion orders.

8. The method of claim 1 comprising using a sub-set of accessibility information to produce a sub-set of media elements, and assigning said media elements to accessibility elements.

9. The method of claim 1 wherein modes of content-transformation specification comprise parsing, data-transformation, and representation assisting documents/artifacts.

10. The method of claim 1, comprising generating metadata about said input computer-based assessment human user interface content and said output computer-based assessment human user interface content forms, said metadata identifying relationships between original computer-based assessment human user interface input and second and subsequent computer-based assessment human user interface forms.

11. The method of claim 10 wherein said metadata is encapsulated in a form of Accessible Portable Item Protocol (APIP) variant entities, whereby which available forms of some computer-based assessment human user interface content should be used or operated upon in a given circumstance is resolved.

12. The method of claim 10, wherein said metadata comprises identification information, said identification information comprising transferred and adopted versions of metadata about original computer-based assessment human user interface input content, and production lifecycle metadata.

13. The method of claim 10, wherein said metadata comprises a time and means of secondary form creation.

14. One or more non-transitory computer-readable media storing one or more computer-executable programming instructions that when executed cause a computer processor to carry out steps comprising:
- one or more instructions for accepting computer-based assessment human user interface content in a first form;
- one or more instructions for identifying a type of said computer-based assessment human user interface content;
- one or more instructions for accepting parameter specification input;
- one or more instructions for specifying at least a second computer-based assessment human user interface form;
- one or more instructions for converting said computer-based assessment human user interface content form from said first computer-based assessment form to said second computer-based assessment human user interface form; and
- one or more instructions for continuing conversion for any computer-based assessment human user interface forms subsequent to said second computer-based assessment human user interface form,
- wherein generating metadata about said input computer-based assessment human user interface content and said output computer-based assessment human user interface content forms, said metadata identifying relationships between original computer-based assessment human user interface input and second and subsequent computer-based assessment human user interface forms, and said metadata is encapsulated in a form of Accessible Portable Item Protocol (APIP) variant entities, whereby which available forms of some computer-based assessment human user interface content should be used or operated upon in a given circumstance is resolved.

15. The media of claim 14 wherein said accepted computer-based assessment human user interface content is compliant with Accessible Portable Item Protocol (APIP) specification standard.

16. The media of claim 14 comprising one or more instructions for producing file names and associating said file names and said metadata with accessibility elements defined within XML code.

17. The media of claim 14 wherein input comprises one or more instructions for parameters that supply at least a subset of a capability to translate/transcribe/transform computer-based assessment human user interface content themselves.

18. The media of claim 14 comprising one or more instructions for converting between at least two of text, Nemeth code, Mathml, ASCII, Braille, JavaScript Object Notation (JSON), sign language, and HTML.

19. A computer system comprising one or more processors and computer-readable memory comprising computer executable instructions stored therein that, responsive to execution by said one or more processors, cause said one or more processors to:
- import a computer-based assessment human user interface test item;
- access business rules residing in a rule library, wherein said business rules are different for question content versus feedback content versus rubric content versus instructional content, all of which may be within a single computer-based assessment human user interface content asset;
- apply translation and transcription algorithms to convert computer-based assessment human user interface content from one form to another;
- apply said business rules and said translation/transcription algorithms to produce access elements, resource metadata, and inclusion orders;
- use a sub-set of accessibility information to produce a sub-set of media elements in an automated manner;
- assign said media elements to accessibility elements;
- record results as XML that complies with an accessibility standard to produce an accessibility standard compliant item file; and
- verify said file as being accessibility standard compliant,
- wherein generating metadata about said input computer-based assessment human user interface content and said output computer-based assessment human user interface content forms, said metadata identifying relationships between original computer-based assessment human user interface input and second and subsequent computer-based assessment human user interface forms, and said metadata is encapsulated in a form of Accessible Portable Item Protocol (APIP) variant entities, whereby which available forms of some computer-based assessment human user interface content should be used or operated upon in a given circumstance is resolved.

* * * * *